(12) United States Patent
Ninomiya et al.

(10) Patent No.: US 7,662,458 B2
(45) Date of Patent: Feb. 16, 2010

(54) HONEYCOMB STRUCTURED BODY, METHOD FOR MANUFACTURING HONEYCOMB STRUCTURED BODY AND HONEYCOMB STRUCTURED BODY MANUFACTURING APPARATUS

(75) Inventors: Takeshi Ninomiya, Ibi-gun (JP); Masaki Imaeda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 16 days.

(21) Appl. No.: 11/760,037

(22) Filed: Jun. 8, 2007

(65) Prior Publication Data

US 2008/0138567 A1    Jun. 12, 2008

Related U.S. Application Data

(63) Continuation of application No. PCT/JP2006/300139, filed on Jan. 10, 2006.

(30) Foreign Application Priority Data

Apr. 28, 2005    (JP)    ............... 2005-132762

(51) Int. Cl.
  *B32B 3/12*    (2006.01)
  *B01D 39/20*    (2006.01)
  *B01D 46/00*    (2006.01)
  *B01D 53/00*    (2006.01)

(52) U.S. Cl. ................ 428/116; 55/523; 423/215.5; 502/527.19

(58) Field of Classification Search ............... 502/439, 502/527.19, 527.14, 527.15, 527.16, 527.17; 428/116; 156/60, 64, 73.6, 89.22, 500, 501; 55/523; 423/215.5
See application file for complete search history.

(56) References Cited

U.S. PATENT DOCUMENTS

| 4,990,402 | A |   | 2/1991 | Kneringer et al. |
| 5,767,026 | A | * | 6/1998 | Kondoh et al. ............ 501/97.1 |
| 5,914,187 | A |   | 6/1999 | Naruse et al. |
| 6,669,751 | B1 |  | 12/2003 | Ohno et al. |
| 7,284,980 | B2 |  | 10/2007 | Saijo et al. |
| 2004/0055265 | A1 | | 3/2004 | Ohno et al. |

(Continued)

FOREIGN PATENT DOCUMENTS

JP    57-040576    3/1982

(Continued)

OTHER PUBLICATIONS

International Search Report issued for PCT/JP2006/300139 on Feb. 28, 2006.

*Primary Examiner*—Wayne Langel
*Assistant Examiner*—Brittany M Martinez
(74) *Attorney, Agent, or Firm*—Ditthavong Mori & Steiner, P.C.

(57) ABSTRACT

A honeycomb structured body includes a plurality of honeycomb members which are bonded to one another by interposing an adhesive layer. Each of the honeycomb members has a number of cells placed in parallel with one another in the longitudinal direction with a cell wall therebetween. When the longitudinal direction is defined as the orientation axis, the degree of orientation Ω of the inorganic fibers in the adhesive layer obtained by the Saltykov method is set in the range of about $0.2 \leq \Omega \leq$ about 0.7 or in the range of about $-0.7 \leq \Omega \leq$ about $-0.2$ in the adhesive layer.

11 Claims, 6 Drawing Sheets

U.S. PATENT DOCUMENTS

| | | |
|---|---|---|
| 2004/0112504 A1 | 6/2004 | Roosen et al. |
| 2004/0161596 A1 | 8/2004 | Taoka et al. |
| 2005/0076626 A1 | 4/2005 | Kudo |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0154021 A1 | 7/2006 | Ohno et al. |
| 2006/0166820 A1 | 7/2006 | Ogyu |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0245465 A1 | 11/2006 | Saijo et al. |
| 2006/0254231 A1 | 11/2006 | Hayashi et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237428 A1 | 10/2008 | Kobayashi et al. |
| 2008/0237942 A1 | 10/2008 | Takamatsu |
| 2008/0241015 A1 | 10/2008 | Kudo et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | | |
|---|---|---|---|
| JP | 61-031367 | | 2/1986 |
| JP | 62-143881 | | 6/1987 |
| JP | 2-074574 | | 3/1990 |
| JP | 3-237074 | | 10/1991 |
| JP | 8-28246 | | 1/1996 |
| JP | 11-114336 | | 4/1999 |
| JP | 2000-279729 | | 10/2000 |
| JP | 2002-177719 | * | 6/2002 |
| JP | 2004-525849 | | 8/2004 |
| JP | 2005-154202 | | 6/2005 |
| WO | WO 2002-074715 | | 9/2002 |

* cited by examiner

A-A line cross-sectional view

HONEYCOMB STRUCTURED BODY, METHOD FOR MANUFACTURING HONEYCOMB STRUCTURED BODY AND HONEYCOMB STRUCTURED BODY MANUFACTURING APPARATUS

CROSS-REFERENCE TO RELATED APPLICATIONS

This application is a continuation application of PCT/JP2006/300139 filed on Jan. 10, 2006, which claims priority of Japanese Patent Application No. 2005-132762 filed on Apr. 28, 2005. The contents of these applications are incorporated herein by reference in their entirety.

BACKGROUND OF THE INVENTION

1. Field of the Invention

The present invention relates to a honeycomb structured body, a method for manufacturing a honeycomb structured body, and a honeycomb structured body manufacturing apparatus.

2. Discussion of the Background

In recent years, particulates, such as soot, contained in exhaust gases emitted from internal combustion engines of vehicles such as buses and trucks, and construction machines, have raised serious problems, as those particulates are harmful to the environment and the human body.

There have been proposed various honeycomb structured bodies made from porous ceramics, which serve as filters capable of capturing particulates in exhaust gases to purify the exhaust gases.

Conventionally, with respect to the honeycomb structured body of this kind, for example, there has been proposed a ceramic structured body in which a plurality of ceramic members, each having a structure in which a plurality of through holes are placed in parallel with one another in the longitudinal direction and the respective end faces of the through holes are plugged into a checkered pattern, with the opened and closed states being reversed on the gas inlet side and outlet side, and with adjacent through holes allowing gas to permeate from one to the other through a porous partition wall, are combined with one another. In such a ceramic structured body, the ceramic members are mutually combined by interposing a sealing compound. The sealing compound includes at least an inorganic fiber, an organic binder and an inorganic binder, and the degree of orientation of the inorganic fibers is set to 70% or more under the conditions of the fiber length of 20 to 300 µm and the fiber diameter of 3 to 15 µm (for example, see JP-A 2002-177719).

The contents of JP-A 2002-177719 are incorporated herein by reference in their entirety.

SUMMARY OF THE INVENTION

A honeycomb structured body according to the present invention is a honeycomb structured body in which a plurality of honeycomb members are bonded to one another by interposing an adhesive layer, each of the honeycomb members having a number of cells placed in parallel with one another in the longitudinal direction with a cell wall therebetween, in which the adhesive layer includes at least an inorganic fiber and an inorganic binder and, when the longitudinal direction is defined as the orientation axis, the degree of orientation $\Omega$ of the inorganic fibers in the adhesive layer obtained by the Saltykov method is set in the range of about $0.2 \leq \Omega \leq$ about 0.7 or in the range of about $-0.7 \leq \Omega \leq$ about $-0.2$.

With respect to the honeycomb structured body according to the present invention, the aspect ratio of the inorganic fiber is desirably set to at least about 3 and at most about 50.

Moreover, a coating material layer is desirably formed on the peripheral portion of the honeycomb structured body.

In the above-mentioned honeycomb structured body, either one of the ends of each of the cells is desirably sealed with a plug.

Furthermore, in the above-mentioned honeycomb structured body, a catalyst is desirably supported on at least a portion of the cell wall.

In the honeycomb structured body according to the present invention, the inorganic fiber is desirably a silica-alumina fiber, a mullite fiber, an alumina fiber, a silica fiber or an aluminum borate whisker.

In the honeycomb structured body according to the present invention, the average fiber diameter of the inorganic fiber is desirably at least about 0.5 µm and at most about 10 µm, and the average fiber length of the inorganic fiber is desirably at least about 1.5 µm and at most about 500 µm.

In the honeycomb structured body according to the present invention, the inorganic binder is desirably a silica-sol or an alumina-sol. Further, it is desirable that the adhesive layer further includes inorganic particles.

In the honeycomb structured body according to the present invention, the inorganic particles are desirably silicon carbide particles, silicon nitride particles, boron nitride particles, alumina particles, or silica particles.

A method for manufacturing a honeycomb structured body according to the present invention includes:

manufacturing a honeycomb member aggregated body by assembling honeycomb members to one another by interposing a cavity-holding member, each of the honeycomb members having a large number of cells placed in parallel with one another in the longitudinal direction with a cell wall therebetween; and forming an adhesive layer by filling a cavity between the honeycomb members of the honeycomb member aggregated body with an adhesive material paste, wherein the adhesive material paste includes at least an inorganic fiber and an inorganic binder.

In the method for manufacturing a honeycomb structured body according to the present invention, when the longitudinal direction is defined as the orientation axis, the degree of orientation $\Omega$ of the inorganic fibers obtained by the Saltykov method is desirably set in the range of about $0.2 \leq \Omega \leq$ about 0.7 or in the range of about $-0.7 \leq \Omega \leq$ about $-0.2$.

In the method for manufacturing a honeycomb structured body according to the present invention, the material for the cavity-holding member is desirably paper, inorganic matters, ceramic, organic fibers, or resins. Further, the cavity-holding member is desirably disposed at the neighborhood of the four corners of side faces of the honeycomb members.

In the method for manufacturing a honeycomb structured body according to the present invention, it is desirable that filling of the cavity with the adhesive material paste is carried out either after the honeycomb member aggregated body is housed in a cylindrical jig for filling the cavity with the adhesive material paste, or after the honeycomb members are assembled in the cylindrical jig. Moreover, it is desirable that the method for manufacturing a honeycomb structured body of the present invention further includes vibrating the honeycomb member aggregated body to which the adhesive material paste is injected.

A honeycomb structured body manufacturing apparatus of the present invention, which is used upon filling a cavity of a honeycomb member aggregated body with an adhesive material paste, the honeycomb member aggregated body assembled by interposing a cavity-holding member between honeycomb members, includes:

a cylindrical body capable of housing the honeycomb member aggregated body and provided with openings at the side face and one end portion;

an adhesive material paste supplying chamber attached to an outer side face and one outer end portion of the cylindrical body such that the paste supplying chamber is allowed to communicate with the interior space of the cylindrical body through the openings;

an extruding mechanism attached to the adhesive material paste supplying chamber so as to extrude the adhesive material paste charged into the adhesive material paste supplying chamber; and an openable and closable bottom plate attached to an end portion opposite to the outer end portion to which the adhesive material paste supplying chamber is attached.

In the honeycomb structured body manufacturing apparatus according to the present invention, the bottom plate is desirably a bottom plate made of an air permeable material or an airtight material with air holes.

In the honeycomb structured body manufacturing apparatus according to the present invention, the cylindrical body is desirably an assembling-type jig that can be disassembled, an integral jig, or a jig capable of tightly binding the honeycomb member aggregated body housed in the cylindrical body.

In the honeycomb structured body manufacturing apparatus according to the present invention, it is desirable that the adhesive material paste supplying chamber is detachable. Further, the opening is desirably formed as a supplying groove.

Moreover, it is desirable that the honeycomb structured body manufacturing apparatus according to the present invention is capable of carrying out sucking on the end portion opposite to the outer end portion to which the adhesive material paste supplying chamber of the cylindrical body is attached.

DESCRIPTION OF THE EMBODIMENTS

The honeycomb structured body according to the embodiments of the present invention is a honeycomb structured body formed in which a plurality of honeycomb members are bonded to one another by interposing an adhesive layer, each of the honeycomb members having a number of cells placed in parallel with one another in the longitudinal direction with a cell wall therebetween, in which the adhesive layer includes at least an inorganic fiber and an inorganic binder and, when the longitudinal direction is defined as the orientation axis, the degree of orientation $\Omega$ of inorganic fibers obtained by the Saltykov method is set in the range of about $0.2 \leqq \Omega \leqq$ about 0.7 or in the range of about $-0.7 \leqq \Omega \leqq$ about $-0.2$ in the adhesive layer.

According to the embodiment of the honeycomb structured body of the present invention, since the degree of orientation $\Omega$ of inorganic fibers obtained by the Saltykov method is set in the range of about $0.2 \leqq \Omega \leqq$ about 0.7 or in the range of about $-0.7 \leqq \Omega \leqq$ about $-0.2$, it becomes easier for the inorganic fibers to be sufficiently entangled with one another in the above-mentioned adhesive layer; thus, it becomes easier for a superior adhesion strength to be exerted easily, and further, it becomes possible to absorb the thermal expansion in the honeycomb member due to a thermal stress irrespective of direction so that the honeycomb structured body is superior in thermal shock resistance.

A method for manufacturing a honeycomb structured body according to the embodiment of the present invention includes:

manufacturing a honeycomb member aggregated body by assembling honeycomb members to one another by interposing a cavity-holding member, each of the honeycomb members having a large number of cells placed in parallel with one another in the longitudinal direction with a cell wall therebetween; and forming an adhesive layer by filling a cavity between the honeycomb members of the honeycomb member aggregated body with an adhesive material paste, wherein the adhesive material paste includes at least an inorganic fiber and an inorganic binder.

According to the embodiment of the method for manufacturing a honeycomb structured body of the present invention, the adhesive layer is formed by filling the cavity of honeycomb members with a predetermined adhesive material paste; thus, it is possible to manufacture a honeycomb structured body having a thermal shock resistance capable of absorbing thermal expansion. In addition, assembling honeycomb members to one another by interposing a cavity-holding member makes it possible to adjust the thickness of the adhesive layer between the honeycomb members.

A honeycomb structured body manufacturing apparatus according to the embodiment of the present invention, which is used upon filling a cavity of a honeycomb member aggregated body with an adhesive material paste, the honeycomb member aggregated body assembled by interposing a cavity-holding member between honeycomb members, includes:

a cylindrical body capable of housing the honeycomb member aggregated body and provided with openings at the side face and one end portion;

an adhesive material paste supplying chamber attached to an outer side face and one outer end portion of the cylindrical body such that the paste supplying chamber is allowed to communicate with the interior space of the cylindrical body through the openings;

an extruding mechanism attached to the adhesive material paste supplying chamber so as to extrude the adhesive material paste charged into the adhesive material paste supplying chamber; and an openable and closable bottom plate attached to an end portion opposite to the outer end portion to which the adhesive material paste supplying chamber is attached.

According to the embodiment of the honeycomb structured body manufacturing apparatus of the present invention, a method in which the adhesive material paste is injected into the cavity of honeycomb members from both the side face and end face at the same time is used; thereby, through subsequent processes, it becomes possible to manufacture a honeycomb structured body having the degree of orientation Ω of the inorganic fibers in the adhesive layer within the above range. Also, in the honeycomb structured body manufacturing apparatus according to the embodiment of the present invention, it becomes possible to prevent the adhesive material paste from adhering to the end face of the honeycomb member aggregated body when filling a cavity between the honeycomb members of the honeycomb member aggregated body with an adhesive material paste.

Figure 1:
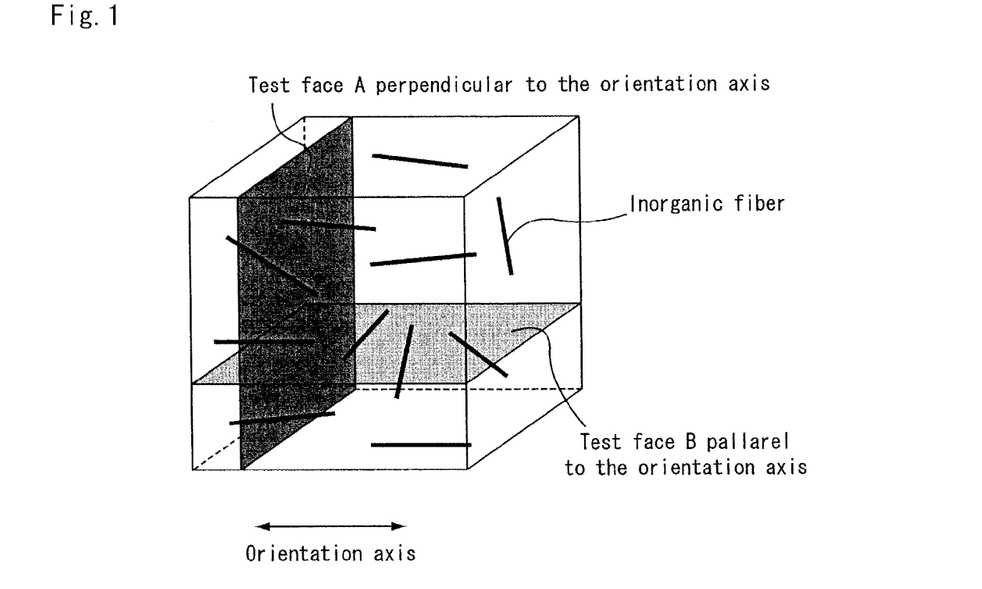
FIG. 1 is an explanatory view that indicates a calculation method for the degree of orientation $\Omega$.

First, referring to FIG. 1, the following description will discuss the degree of orientation Ω of the above-mentioned inorganic fibers, obtained by the Saltykov method, when the longitudinal direction is defined as the orientation axis in the honeycomb structured body according to the embodiments of the present invention.

FIG. 1 is an explanatory view that indicates a calculation method for the degree of orientation Ω.

The degree of orientation Ω can be calculated from the following formula (1):

$$\Omega = (LV)_{or} / \{(LV)_{or} + (LV)_{is}\} \quad (1)$$

Here, $(LV)_{or}$ represents a length of a complete orientation linear element per unit volume and $(LV)_{is}$ represents a length of complete random linear element per unit volume, and these can be calculated from the following formulae (2) and (3) by examining the number of intersections between test faces of two kinds, that is, the face perpendicular to the orientation axis (face perpendicular to the longitudinal direction) and the face parallel to the orientation axis (face parallel to the longitudinal direction as well as parallel to the outer wall face of the honeycomb member on which the adhesive layer has been formed), and linear elements.

$$(LV)_{is} = 2(PA)\| \quad (2)$$

$$(LV)_{or} = (PA)\bot - (PA)\| \quad (3)$$

Here, $(PA)\bot$ and $(PA)\|$ respectively represent the numbers of intersections between test faces of unit area that are respectively perpendicular to and parallel to the orientation axis and linear elements. In other words, as shown in FIG. 1, supposing that a test face A perpendicular to the orientation axis (lateral direction in the figure) and a test face B parallel to the orientation axis exist, the numbers of intersections between the inorganic fibers and the test faces A and B are given. In FIG. 1, the number of intersections between the test face A perpendicular to the orientation axis and the inorganic fibers is four, and the number of intersections between the test face B parallel to the orientation axis and the inorganic fibers is three.

The number of intersections between each of the test faces and linear elements is calculated by observing respective test faces by an electronic microscope or the like, and counting the number of fibers penetrating the test face on the observed image.

Here, in the present invention, on the observed image, those fibers having an aspect ratio of less than 1.5 are regarded as penetrating fibers.

In the honeycomb structured body according to the embodiments of the present invention, the degree of orientation Ω to be calculated by the above-mentioned method is set in the range of about $0.2 \leq \Omega \leq$ about 0.7 or in the range of about $-0.7 \leq \Omega \leq$ about $-0.2$.

Concerning the degree of orientation Ω, in the case of Ω>about 0.7 or Ω<about −0.7, too many inorganic fibers tend to be oriented either in the direction perpendicular to the orientation axis or in the direction parallel to the orientation axis. For this reason, upon loading of a thermal stress on the honeycomb structured body, it becomes difficult for the thermal expansion of the honeycomb member in the direction perpendicular to the oriented direction of the inorganic fibers to be absorbed, and thus thermal shock resistance properties tend to easily become insufficient.

In contrast, in the case where the degree of orientation Ω is set in the range of about $-0.2 < \Omega <$ about 0.2, it is considered that a few inorganic fibers tend to be oriented, and therefore, the inorganic fibers have difficulty in being sufficiently entangled with one another. In this case, it becomes difficult to exert a sufficient adhesion strength.

From the above-mentioned reason, the degree of orientation Ω is desirably set in the range of about $0.2 \leq \Omega \leq$ about 0.7 or in the range of about $-0.7 \leq \Omega \leq$ about $-0.2$.

Further, the degree of orientation Ω is more desirably set in the range of about $0.2 \leq \Omega \leq$ about 0.5 or in the range of about $-0.5 \leq \Omega \leq$ about $-0.2$.

Here, the honeycomb shape is a shape that tends to easily cause anisotropy in the thermal conductivity between the longitudinal direction and the direction perpendicular thereto (hereinafter, referred to also as the radial direction). For this reason, the honeycomb shape tends to have relatively higher thermal expansion and thermal conductivity in the longitudinal direction in comparison with those in the radial direction.

The honeycomb structured body according to the embodiments of the present invention includes a plurality of honeycomb members bonded to one another by interposing an adhesive layer, each honeycomb member having a structure in which a number of cells are placed in parallel with one another in the longitudinal direction with a cell wall therebetween. With respect to the number of cells, one of the ends of each cell is desirably sealed.

Referring to Figures, the following description will discuss the honeycomb structured body according to the embodiments of the present invention. Although, the following description will explain a honeycomb structured body in which one of ends of each cell is sealed, an end portion of the plurality of cells is not always sealed in the honeycomb structured body according to the embodiments of the present invention.

Figure 2:
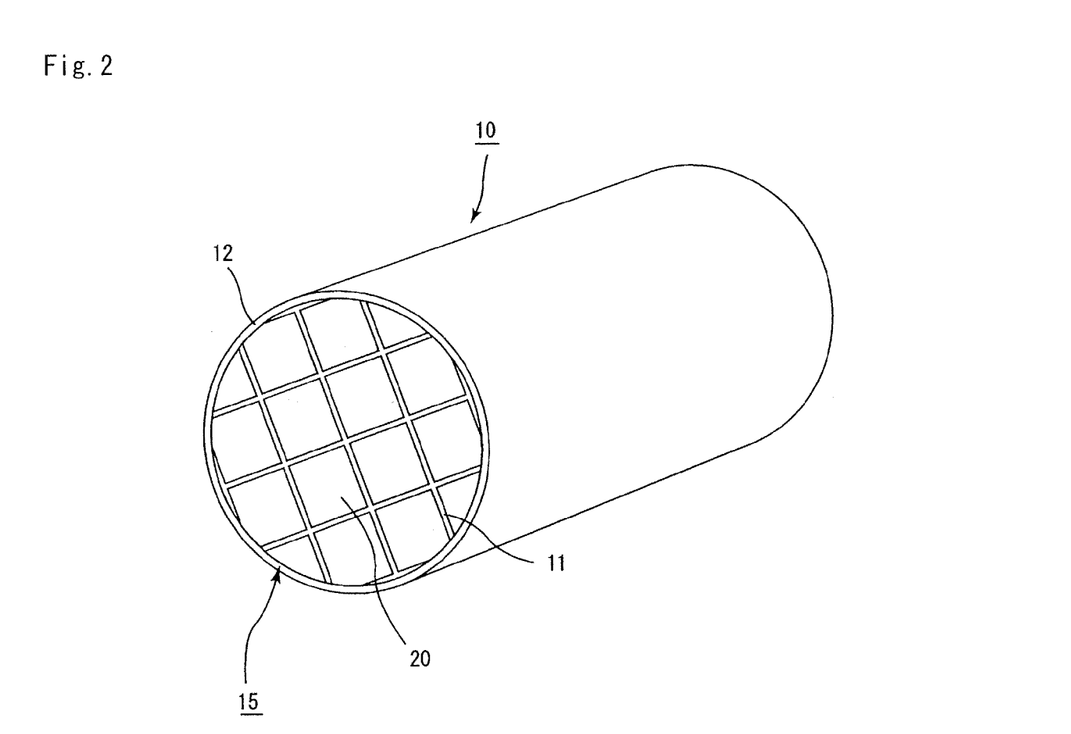
FIG. 2 is a perspective view that schematically shows one example of the honeycomb structured body according to an embodiment of the present invention.
Figure 3A:
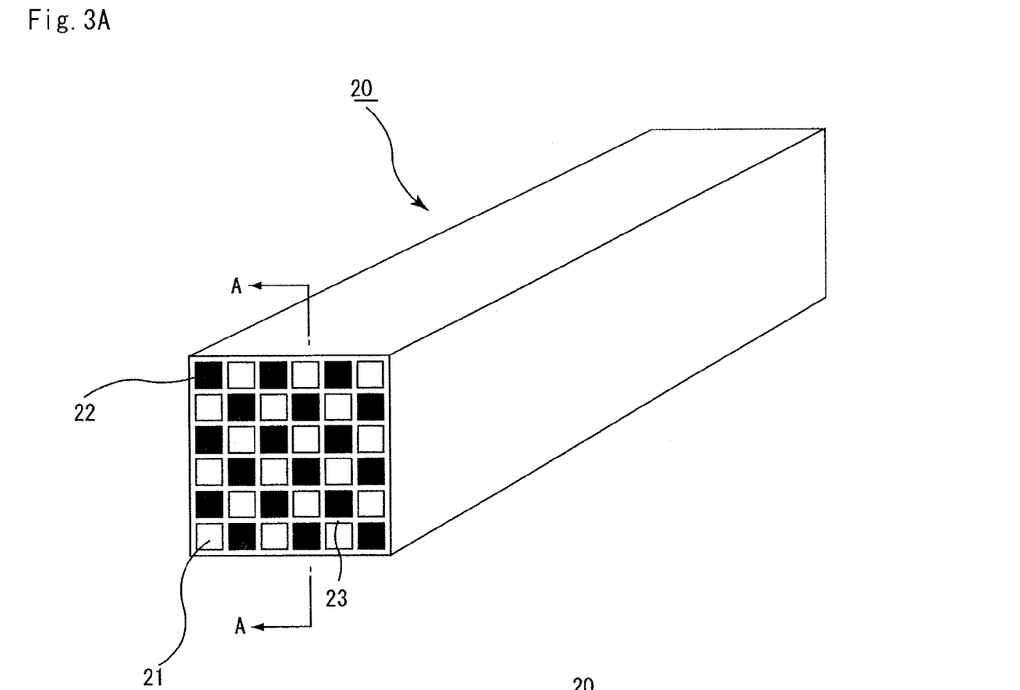
FIG. 3A is a perspective view that schematically shows a honeycomb member constituting the honeycomb structured body according to an embodiment of the present invention.
Figure 3B:
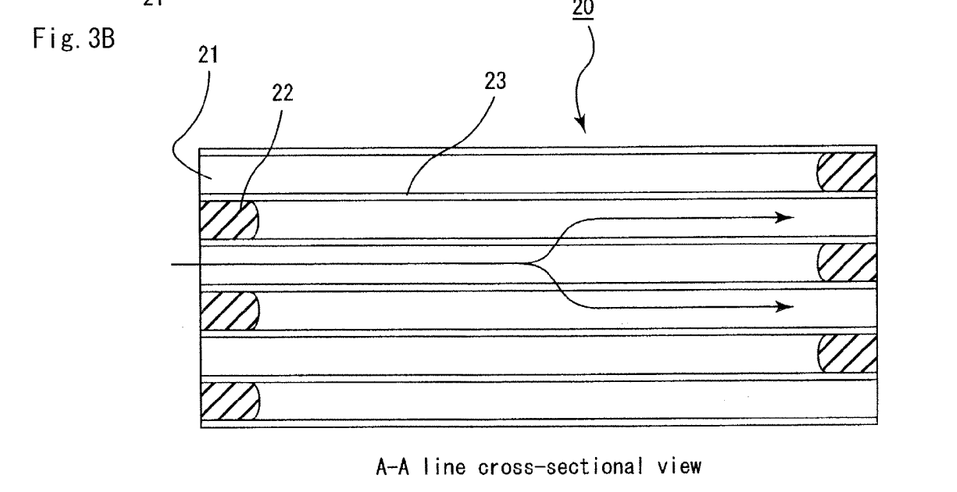
FIG. 3B is an A-A line cross-sectional view of FIG. 3A.

FIG. 2 is a perspective view that schematically shows one example of the honeycomb structured body according to an embodiment of the present invention, FIG. 3A is a perspective view that schematically shows the honeycomb member constituting the honeycomb structured body according to an embodiment of the present invention shown in FIG. 2, and FIG. 3B is an A-A line cross-sectional view of the honeycomb member shown in FIG. 3A.

As shown in FIG. 2, the honeycomb structured body 10 according to an embodiment of the present invention has a configuration in which a plurality of honeycomb members 20 made of ceramic such as silicon carbide are combined by interposing an adhesive layer 11 to constitute a cylindrical honeycomb block 15, and a coating material layer 12 is formed on the peripheral portion of the honeycomb block 15.

Although, the shape of the honeycomb block of the honeycomb structured body 10 according to an embodiment of the present invention, shown in FIG. 2, is a cylindrical shape, the honeycomb block may have arbitrary shape such as a cylindroid shape and a rectangular-pillar shape without being limited to a cylindrical shape.

As shown in FIGS. 3A and 3B, the honeycomb member 20 has a plurality of cells 21 placed in parallel with one another in the longitudinal direction so that cell walls (wall portions) 23 that separate the cells 21 are allowed to function as filters. In other words, each of the cells 21 formed in the honeycomb member 20 has either one of the ends on the inlet side or the outlet side of exhaust gases sealed with a plug 22 as shown in FIG. 3B so that exhaust gases that have flowed into one of the cells 21 are allowed to flow out of another cell 21 after surely having passed through the cell wall 23 that separates the cells 21.

Here, the degree of orientation Ω in the longitudinal direction of the adhesive layer 11 is set in the above-mentioned range; therefore, in the honeycomb structured body 10, it becomes possible for the adhesive layer 11 to more easily absorb a thermal expansion and the like, occurred in the honeycomb member 20 due to a thermal stress, so that the honeycomb structured body 10 tends to easily obtain superior thermal shock resistance.

The honeycomb structured body 10 mainly includes porous ceramics, and examples of the material thereof include nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite, silica and aluminum titanate. Here, the honeycomb structured body 10 may be formed by using two or more kinds of materials, such as a composite body of silicon and silicon carbide. In the case where the composite body of silicon and silicon carbide is used, silicon is desirably added thereto to make up to at least about 5% by weight and at most about 45% by weight of the entire body.

With respect to the porous ceramic material, a silicon carbide based ceramic is desirably used, since this material is superior in heat resistance, mechanical characteristics and has a high thermal conductivity. Here, the silicon carbide based ceramic refers to a material having a silicon carbide content of about 60% by weight or more.

In addition, a metal may be used as a material for the honeycomb structured body.

The average pore diameter of the honeycomb structured body (honeycomb member) is not particularly limited, and in case of capturing particulates, the lower limit value is desirably set to about 1 μm and the upper limit value is desirably set to about 100 μm. The average pore diameter of about 1 μm or more makes it difficult for the pressure loss to increase, and in contrast, the average pore diameter of about 100 μm or less makes it easier for the particulate capture efficiency to be high as particulates become less likely to pass through the pores and it becomes easy to surely capture the particulates.

The porosity of the honeycomb structured body (honeycomb member) is not particularly limited, and the lower limit value is desirably set to about 20% and the upper limit value is desirably set to about 80%. When the porosity is about 20% or more, the honeycomb structured body becomes less likely to clog easily upon capturing particulates, and in contrast, when the porosity is about 80% or less, the honeycomb structured body becomes less likely to have low strength and to be broken easily.

The porosity can be measured by conventionally known methods such as a mercury injection method, Archimedes method, a measuring method using a scanning electron microscope (SEM) and the like.

The aperture ratio of the honeycomb structured body (honeycomb member) is not particularly limited, and is desirably set to a lower limit value of about 50% and an upper limit value of about 80%. The aperture ratio of about 50% or more makes it difficult for the pressure loss to be high, and in contrast, the aperture ratio of about 80% or less makes it difficult for the strength of the honeycomb structured body to be low.

In the above-mentioned honeycomb structured body (honeycomb member), the lower limit value of the thickness of the cell walls is desirably about 0.1 mm, and the upper limit value thereof is desirably about 0.5 mm, more desirably about 0.35 mm.

The thickness of the cell walls of about 0.1 mm or more prevents the strength of the honeycomb structured body from becoming too low. In contrast, the thickness of the cell walls of about 0.5 mm or less prevents the pressure loss from becoming too high, as well as making it difficult for the thermal capacity of the honeycomb structured body to become too large. Consequently, even when a catalyst is supported thereon, it sometimes becomes easier to purify exhaust gases immediately after the start of an engine.

The plugs 22 and the cell walls 23 constituting the honeycomb member 20 are desirably made of the same porous ceramic material. With this arrangement, it becomes possible to make the adhesion strength between the two members higher, and by adjusting the porosity of the plug 22 in the same manner as the cell walls 23, it becomes possible to match the coefficient of thermal expansion of the cell walls 23 with the coefficient of thermal expansion of the plugs 22, so that it becomes possible to prevent gaps from occurring between the plugs 22 and the cell walls 23 due to a thermal stress upon production and in use, and also to prevent cracks from occurring in the plugs 22 as well as in the cell walls 23 at portions in contact with the plugs 22. Here, the cell walls 23 refer to both of the cell walls that separate the cells 21 from each other and the peripheral portion.

With respect to the thickness of the plug 22, although not particularly limited, the lower limit value is desirably about 1 mm, and the upper limit value is desirably about 20 mm when the plug 22 is made of porous silicon carbide. More desirably, the lower limit value is about 3 mm, and the upper limit value is about 10 mm.

Here, the plug that seals either one of the end portions of the cell can be formed on demand. When particulates are captured by using the honeycomb structured body according to the embodiments of the present invention, the above-mentioned plug is formed.

With respect to the honeycomb structured body 10 according to an embodiment of the present invention, the adhesive layer 11 has functions of not only absorbing thermal expansion of the honeycomb structured body, but, as formed between the honeycomb members 20, serving as an adhesive to combine the plurality of honeycomb members 20 with each other. The adhesive layer 11 also has a function of preventing leakage of exhaust gases.

The materials constituting the adhesive layer 11 at least include an inorganic fiber and an inorganic binder.

Examples of the inorganic fiber include ceramic fibers or whisker, such as silica-alumina, mullite, alumina, silica and aluminum borate whisker. Each of these materials may be used alone, or two or more of them may be used in combination. Among the inorganic fibers, silica-alumina fiber is desirable.

The lower limit value of the aspect ratio of the inorganic fiber is desirably about 3. When the aspect ratio is about 3 or more, it becomes easy for the contact points to the inorganic binder at which the inorganic fibers are mutually bonded to one another to increase, so that the adhesion strength becomes more easily improved.

Moreover, the upper limit value of the aspect ratio is desirably about 50. The aspect ratio of about 50 or less is less likely to cause voids between the mutual inorganic fibers in the adhesive layer that has been formed, and thus making it easy to exert a sufficient adhesion strength.

Here, the aspect ratio refers to a value calculated by the following formula: (average fiber length of inorganic fibers) ÷(average fiber diameter of inorganic fibers).

The lower limit value of the average fiber diameter of the inorganic fibers is desirably set to about 0.5 µm, and the upper limit value is desirably set to about 10 µm. Moreover, the lower limit value of the average fiber length of the inorganic fibers is desirably set to about 1.5 µm, more desirably set to about 10 µm, and the upper limit value is desirably set to about 500 µm, more desirably set to about 100 µm.

Examples of the inorganic binder include silica-sol, alumina-sol and the like. Each of them may be used alone, or two or more of them may be used in combination. Among the binders, silica-sol is desirably used.

The adhesive layer may include an organic binder. By compounding an organic binder to adjust the viscosity of the adhesive material paste, it becomes possible to improve the attachment property of the adhesive material paste, and further, to improve the adhesion property of the adhesive layer. Here, the desirable viscosity of the adhesive material paste is at least about 20 Pa·s and at most about 35 Pa·s.

Examples of the organic binder include polyvinyl alcohol, methyl cellulose, ethyl cellulose, carboxymethyl cellulose and the like. Each of them may be used alone, or two or more of them may be used in combination. Among the organic binders, carboxymethyl cellulose is more desirably used.

The adhesive layer may further include inorganic particles.

Examples of the inorganic particles include carbides, nitrides, oxides and the like, more specifically, inorganic particles made of silicon carbide, silicon nitride, boron nitride, alumina, silica or the like. Each of these may be used alone, or two or more kinds of these may be used in combination. Among the above-mentioned inorganic particles, silicon carbide, which is superior in thermal conductivity, is more desirably used.

Moreover, a pore-forming agent such as balloons that are fine hollow spheres composed of oxide-based ceramics, spherical acrylic particles and graphite may be added to the paste used for forming the adhesive layer, if necessary.

Examples of the balloons include, although not particularly limited, alumina balloons, silica-alumina balloons, glass micro-balloons, shirasu balloons, fly ash balloons (FA balloons) and the like. Among these, silica-alumina balloons are more desirably used.

In the honeycomb structured body according to the embodiments of the present invention, in the case where, upon calculating the degree of orientation $\Omega$ by using the above-mentioned method, the inorganic fiber and the balloon are blended in the adhesive layer, the cross sections of these are sometimes observed on a test face (observation face) in such a state as not to be distinguished from cross sections of inorganic fibers penetrating the test face; however, in the honeycomb structured body according to the embodiments of the present invention, the degree of orientation $\Omega$ is calculated, with those cross sections that are not distinguished from the cross sections of inorganic fibers, such as the cross sections of inorganic particles, being included. This is because these particles do not exert anisotropy.

Moreover, in the adhesive layer, shots of inorganic fibers (granulated matters that have not been formed into fibers) tend to be observed in such a state as not to be distinguished from cross sections of inorganic fibers in the same manner as described above; however, in this case also, the degree of orientation $\Omega$ is calculated, with those cross sections of shots that are not distinguished from the cross sections of inorganic fibers being included.

The coating material layer 12, which is formed to cover the peripheral face of the honeycomb block 15, is also allowed to function as a sealing material used for preventing exhaust gases from leaking from the peripheral face of the honeycomb block 15 when the honeycomb structured body 10 is placed in an exhaust passage of an internal combustion engine, and as a member for adjusting the shape of the honeycomb structured body and as a reinforcing member.

Here, the coating material layer may be formed depending on the needs.

As materials constituting the coating material layer 12, the same kinds of materials constituting the adhesive layer 11 and the like may be exemplified.

Here, the adhesive layer 11 and the coating material layer 12 may be formed by using the same materials or different materials. Furthermore, in the case where the adhesive layer 11 and the coating material layer 12 are made from the same material, the compounding ratio of materials thereof may be the same or may be different.

Further, in the honeycomb structured body according to the embodiments of the present invention, as to the entire end surface of the honeycomb structured body, the cells may include those cells (referred to as inlet-side cell group) whose end portions at the outlet side are sealed with a plug in such a manner that the total area in the cross-section perpendicular to the longitudinal direction is relatively large, and on the other hand, those cells (referred to as outlet-side cell group) whose end portions at the inlet side are sealed with the plug in such a manner that the total area in the above-mentioned cross section is relatively small, so that open area of the inlet-side cell group and outlet-side cell group may be changed.

With respect to the combination of the inlet-side cell group and the outlet-side cell group, examples thereof include: (1) a case where a respective cell constituting the inlet-side cell group and a respective cell constituting the outlet-side cell group have the same perpendicular cross-section area, and the number of cells constituting the inlet-side cell group is larger, (2) a case where a respective cell constituting the inlet-side cell group and a respective cell constituting the outlet-side cell group have a different perpendicular cross-section area, and the number of cells is also different, and (3) a case where, with respect to a respective cell constituting the inlet-side cell group and a respective cell constituting the outlet-side cell group, the cells constituting the inlet-side cell group have a larger perpendicular cross-section area, and the number of cells in both groups is the same.

Moreover, the cell constituting the inlet-side cell group and/or the cell constituting the outlet-side cell group may be constituted by one type of cell in which the shape, the perpendicular cross-section area and the like are the same, or may be constituted by two or more types of cells in which the shape, the perpendicular cross-section area and the like differ from one another.

With respect to the honeycomb structured body according to the embodiments of the present invention, a catalyst may be supported on at least a portion of the cell wall.

In the honeycomb structured body according to the embodiments of the present invention, with a catalyst supported thereon that is capable of converting toxic gas components such as CO, HC, NOx in exhaust gases, it becomes possible to sufficiently convert toxic gas components in the exhaust gases by the catalytic reaction.

Further, by supporting a catalyst that helps burning of particulates on the cell wall, it becomes possible to burn and remove particulates more easily. As a result, the above-mentioned honeycomb structured body according to the embodiments of the present invention makes it possible to improve the performance of purifying exhaust gases, and further makes it possible to reduce the energy for burning particulates.

Examples of the catalyst include catalyst made of noble metal such as platinum, palladium and rhodium, although not particularly limited thereto. In addition to these noble metals, a compound including an alkali metal (Group 1 in Element Periodic Table), an alkali earth metal (Group 2 in Element Periodic Table), a rare-earth element (Group 3 in Element Periodic Table) and a transition metal element may be supported thereon.

Moreover, when applying the catalyst to the honeycomb structured body, the surface of the honeycomb structured body may be coated with a catalyst supporting layer such as alumina in advance, and the catalyst may be applied thereto.

Examples of the catalyst supporting layer include oxide ceramics such as alumina, titania, zirconia and silica.

Here, the honeycomb structured body with the catalyst supported thereon is allowed to function as a gas purifying device in the same manner as conventionally known DPFs (Diesel Particulate Filters) with a catalyst. Therefore, detailed description of the case where the honeycomb structured bodies according to the embodiments of the present invention also function as a catalyst supporting carrier is omitted.

In the honeycomb structured body disclosed in JP-A 2002-177719, since the degree of orientation is set to about 70% or more in the longitudinal direction, the orientation of inorganic fibers is aligned to a certain degree. In the honeycomb structured body of this kind, although, upon loading of a thermal stress in use, the thermal expansion in the ceramic member in the direction parallel to the orientation of the inorganic fibers can be absorbed, it is difficult to absorb the thermal expansion in the direction perpendicular to the orientation of the inorganic fibers. Therefore, problems such as deterioration of the adhesion strength between the ceramic members tend to occur easily.

In particular, when the honeycomb structured body reaches a high temperature, this problem tends to occur, resulting in a problem in terms of the thermal shock resistance.

According to the honeycomb structured body according to the embodiments of the present invention, since the degree of orientation $\Omega$ of inorganic fibers obtained by the Saltykov method is set in the range of about $0.2 \leq \Omega \leq$ about $0.7$ or in the range of about $-0.7 \leq \Omega \leq$ about $-0.2$, it becomes easier for the inorganic fibers to be sufficiently entangled with one another in the above-mentioned adhesive layer; thus, a superior adhesion strength tends to be exerted easily, and further, it becomes possible for the adhesive layer to absorb the thermal expansion in the honeycomb member due to a thermal stress irrespective of direction so that the honeycomb structured body is superior in thermal shock resistance.

Next, the following description will discuss one example of a manufacturing process of the honeycomb structured body according to the embodiments of the present invention.

First, using material paste mainly including the above-mentioned ceramic material, an extrusion-molding process is carried out to manufacture a square-pillar shaped ceramic molded body.

Although the material paste is not particularly limited, material paste which sets the porosity of the honeycomb structured body after manufacturing of at least about 20% and at most about 80% is desirable, and, for example, a material paste prepared by adding a binder, a dispersion medium and the like to powder containing the above-mentioned ceramics may be used.

With respect to the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 0.3 μm and at most about 70 μm with at least about 5 parts by weight and at most about 65 parts by weight of powders having an average particle diameter of at least about 0.1 μm and at most about 1.0 μm, are preferably used.

It is possible to adjust the pore diameter and the like of the honeycomb member by adjusting the firing temperature and the particle diameter of the ceramic powder.

Examples of the above-mentioned binder include, although not particularly limited, methyl cellulose, carboxymethyl cellulose, hydroxyethyl cellulose and the like.

In general, the compounding amount of the above-mentioned binder is desirably set to at least about 1 part by weight and at most about 15 parts by weight with respect to 100 parts by weight of the ceramic powder.

Examples of the dispersion medium include, although not particularly limited, an organic solvent such as benzene; alcohol such as methanol; water, and the like.

An appropriate amount of the above-mentioned dispersion medium is mixed therein so that the viscosity of the material paste is set within a fixed range.

These ceramic powder, binder and dispersion medium are mixed by an attritor and the like, and sufficiently kneaded by a kneader and the like, and then extrusion-molded.

Moreover, a molding auxiliary may be added to the material paste, if necessary.

Examples of the molding auxiliary include, although not particularly limited, ethylene glycol, dextrin, fatty acid, fatty acid soap, polyvinyl alcohol and the like.

Moreover, depends on the needs, a pore-forming agent such as balloons that are fine hollow spheres composed of oxide-based ceramics, spherical acrylic particles and graphite may be added to the above-mentioned material paste.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Next, the above-mentioned ceramic molded body is dried by using a drier such as a microwave drier, a hot-air drier, oven, a dielectric drier, a reduced-pressure drier, a vacuum drier and a freeze drier so that a ceramic dried body is formed. Thereafter, when the product to be manufactured is used for capturing particulates, a predetermined amount of plug material paste, which forms plugs, is injected into the end portion on the outlet side of the inlet-side group of cells and the end portion on the inlet side of the outlet-side group of cells so that the cells are sealed.

With respect to the plug material paste, although not particularly limited, such paste as to set the porosity of a plug produced through the succeeding processes to at least about 30% and at most about 75% is desirably used, and for example, the same paste as the material paste may be used.

Next, degreasing (for example, at a temperature of at least about 200° C. and at most about 500° C.) and firing processes (for example, at a temperature of at least about 1400° C. and at most about 2300° C.) are carried out on the ceramic dried body filled with the plug material paste under predetermined conditions so that a honeycomb member, made from porous ceramics and constituted by a single sintered body as a whole, is manufactured.

Here, with respect to the degreasing and firing conditions of the ceramic dried body, it is possible to apply conditions that have been conventionally used for manufacturing a filter made from porous ceramics.

Figure 4:
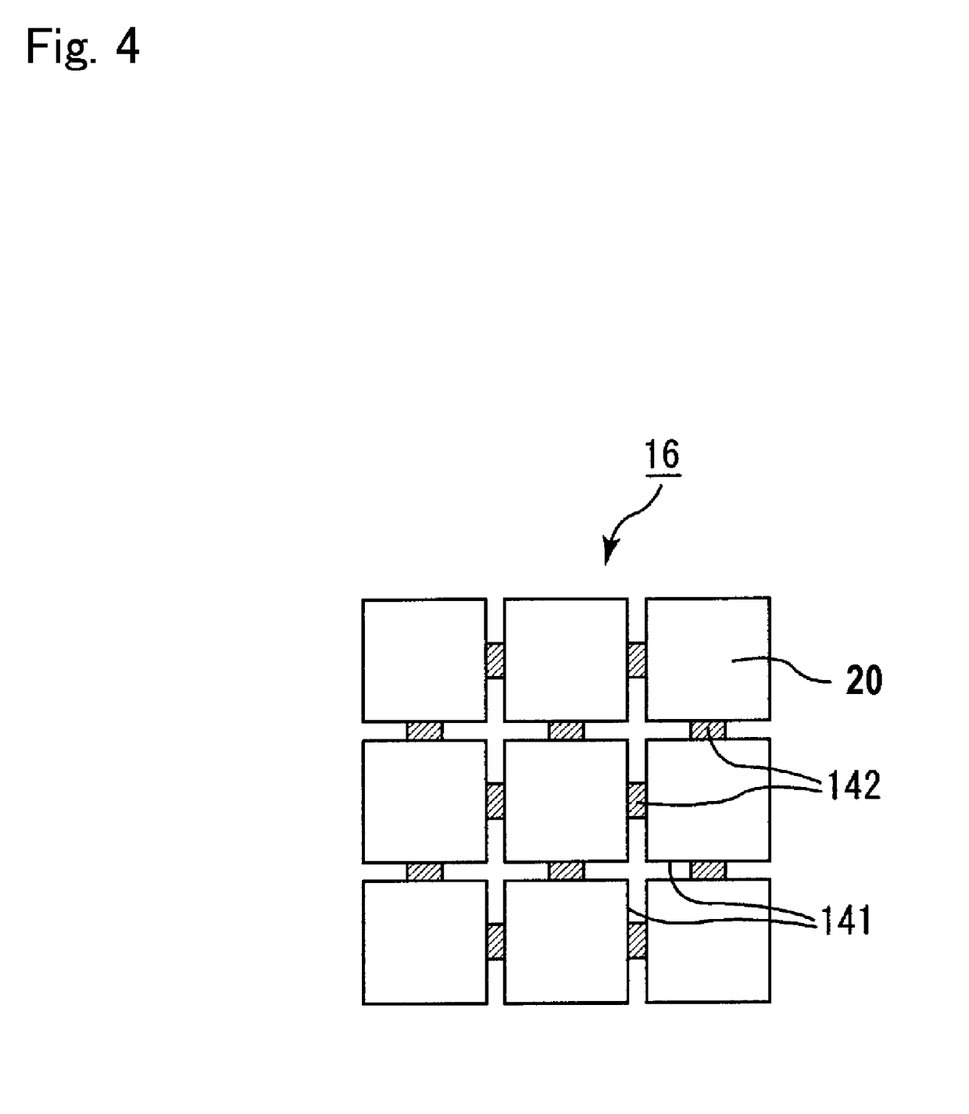
FIG. 4 is a cross-sectional view that shows a honeycomb member aggregated body manufactured in a process of the method for manufacturing a honeycomb structured body according to an embodiment of the present invention.

Next, honeycomb members are assembled to one another by interposing a cavity-holding member (see, FIG. 4).

FIG. 4 is a cross-sectional view that shows a honeycomb member aggregated body manufactured in a process of the method for manufacturing a honeycomb structured body according to the embodiments of the present invention.

As shown in FIG. 4, the plurality of honeycomb members 20 manufactured through the above-mentioned method are assembled to one another by interposing the cavity-holding members 142 to manufacture a honeycomb member aggregated body 16.

The cavity-holding members 142 are used for forming a cavity between the respective honeycomb members 20, and by adjusting the thickness of the cavity-holding member 142, it becomes possible to adjust the thickness of the adhesive layer between the respective honeycomb members 20.

The material for the cavity-holding member is not particularly limited, and examples thereof include paper, inorganic matters, ceramic, organic fibers, resins and the like. Moreover, the cavity-holding member may be prepared using a material that is not decomposed nor removed by heat applied to the honeycomb structured body at the time of use thereof.

This is arranged to prevent corrosion of the adhesive layers due to gases generated when cavity-holding members are decomposed or removed. However, those having such a nature as to be decomposed or removed by heating may be used if they do not generate corrosive gases.

Specific examples of the cavity-holding member include cardboard, graphite, silicon carbide and the like. Moreover, the cavity-holding member may be prepared by using the same quality of material as the adhesive layer, and adjusting the thickness in advance and solidifying it thereafter.

The cavity-holding member may be those with a sticking function or adhesive function, or may be those prepared by forming a layer of a substance with a sticking property or adhesive property on both sides of material made of the above-mentioned materials.

By using the cavity-holding member with a sticking function or adhesive function, the honeycomb member aggregated body which has been assembled outside the cylindrical (can-type) jig can be incorporated into the cylindrical (can-type) jig without specially using a jig for fixing and the like, and thus the incorporation process becomes easier and further it becomes possible to prevent the positional deviation of each of the honeycomb members.

The shape of the cavity-holding member is not particularly limited as long as it is possible to hold the honeycomb member, and examples thereof include a cylindrical shape, a rectangular pillar shape and the like.

The size of the cavity-holding member is not particularly limited, and for example, it is desirable that the thickness thereof is at least about 0.5 mm and at most about 30 mm for the cavity-holding member having a cylindrical shape. The reason for this is because thickness in such a range is less likely to degrade the thermal conductivity of ceramics. The thickness of the cavity-holding member is more preferably set to about 2.0 mm or lower.

With respect to the cavity-holding member having a cylindrical shape, the diameter thereof is desirably set to at least about 3.0 mm and at most about 10.0 mm, because it becomes easier for the adhesion strength between the honeycomb members to be secured sufficiently.

The positions of the cavity-holding members disposed on the honeycomb member are, though not particularly limited, desirably in the neighborhood of the four corners of the side faces of the honeycomb member, since such layout makes it easier to combine honeycomb members in parallel with one another.

Next, an adhesive material paste is filled in the cavity between the honeycomb members constituting the honeycomb member aggregated body. Here, filling of the adhesive layer may be carried out while the honeycomb member aggregated body is housed in a cylindrical (can-type) jig for filling the adhesive material paste, or the honeycomb members may be assembled in the cylindrical (can-type) jig.

Figure 5A:
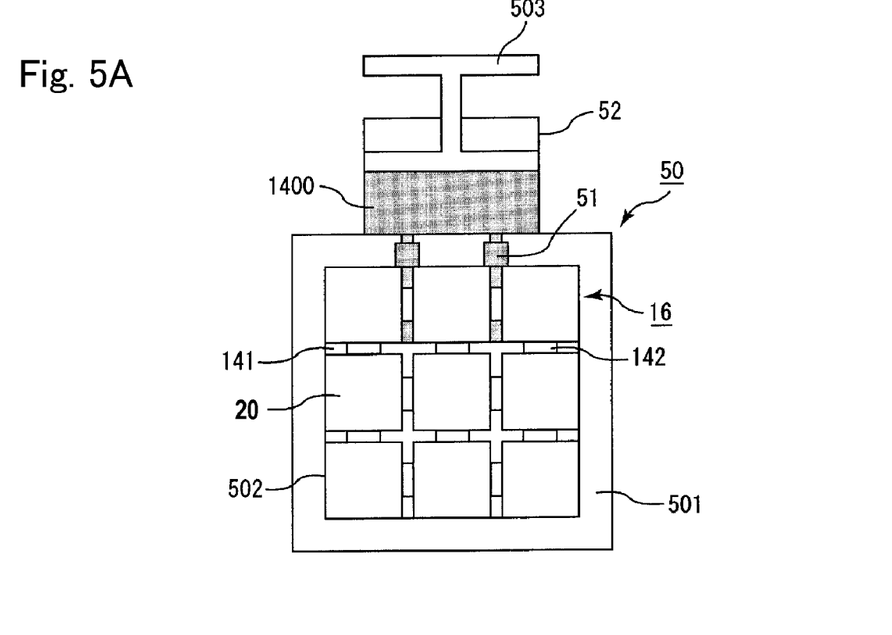
FIGS. 5A and 5B are cross-sectional views that describe the device for manufacturing a honeycomb structured body installed with a cylindrical (can-type) jig which is used when adhesive material paste is filled.
Figure 5B:
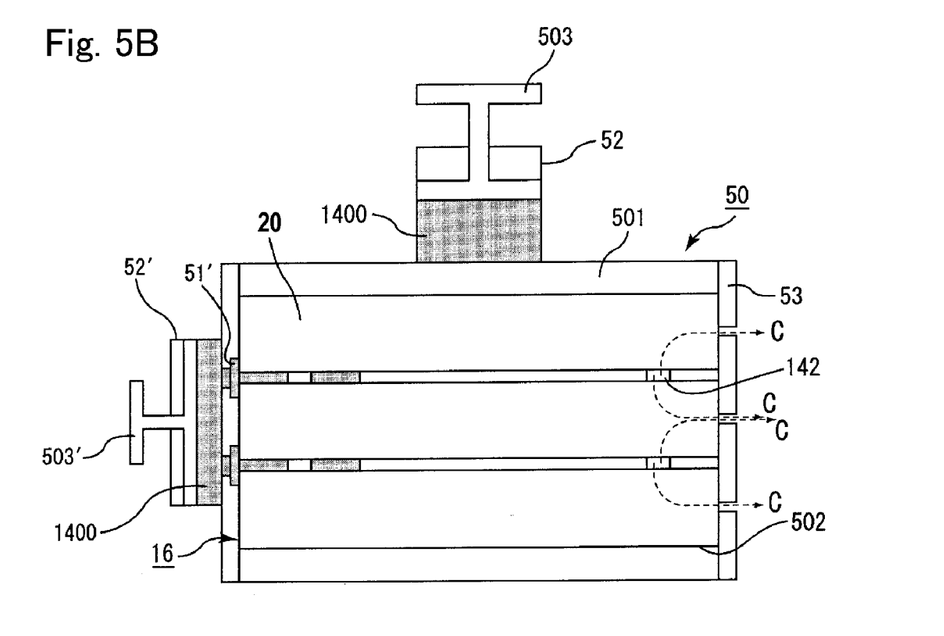

Specifically, for example, it is possible to fill the adhesive material paste using the honeycomb structured body manufacturing apparatus equipped with a cylindrical (can-type) jig as shown in FIGS. 5A and 5B.

FIGS. 5A and 5B are cross-sectional views that describe an embodiment of the device for manufacturing a honeycomb structured body installed with a cylindrical (can-type) jig which is used upon filling an adhesive material paste.

FIG. 5A shows a cross-sectional view perpendicular to the longitudinal direction of the manufacturing apparatus installed inside with the honeycomb member aggregated body, and FIG. 5B shows a cross-sectional view parallel to the longitudinal direction of the manufacturing apparatus equipped inside with the honeycomb member aggregated body.

The manufacturing apparatus 50 is provided with a cylindrical body 501 having an interior space 502 in which a honeycomb member aggregated body is housed. Paste supplying chambers 52 and 52' are attached to the outer side face and another outer end portion of this cylindrical body 501. Openings 51 and 51', which allow the respective supplying chambers 52 and 52' to communicate with the interior space, are formed in the cylindrical body 501, and a paste 1400 is simultaneously supplied via these openings 51 and 51' (hereinafter, described more specifically as a supplying hole or a supplying groove) from a side face and another outer end portion. Extruding mechanisms 503 and 503' used for extruding the sealing material paste 1400 are attached to the supplying chambers 52 and 52', respectively. A retractable bottom plate 53 is attached to the end, which is opposite to the end where the supplying chamber 52' is attached, of the honeycomb structured body manufacturing apparatus 50. When the bottom plates 53 are closed to seal a cavity 141 formed between the honeycomb members 20 constituting the honeycomb member aggregated body 16, it becomes possible to further prevent the adhesive material paste 1400 from adhering to the end face of the honeycomb member aggregated body. honeycomb member aggregated body 16, it becomes possible to further prevent the adhesive material paste 1400 from adhering to the end face of the honeycomb member aggregated body.

However, at the time of filling an adhesive material paste, when the adhesive material paste 1400 is injected into the honeycomb structured body manufacturing apparatus 50, gases in the honeycomb structured body manufacturing apparatus 50 are emitted through the end faces of this manufacturing apparatus 50, and thus the bottom plate 53 needs to be made of a air permeable material or an airtight material with air holes as shown in FIG. 5B.

When those made of an airtight material with air holes are used, gases in the manufacturing apparatus 50 pass through the partition walls of the honeycomb members 20 as the arrows C indicate, and further flow from the honeycomb members 20 through the air holes of the bottom plate 53 to be emitted outside.

The manufacturing apparatus 50 is not particularly limited as long as it is a cylindrical body with paste supplying chambers 52 and 52' being placed on the outer periphery thereof, the supplying chamber 52 and 52' provided with an inner chamber which communicates with the inner periphery through the supplying holes (or the supplying groove) 51 and 51', and as long as it has a structure in which a honeycomb member aggregated body 16 can be placed in the inner periphery thereof, or a structure in which a honeycomb member aggregated body 16 can be assembled inside the inner periphery. Examples of such jigs may include, for example, an assembling-type jig that can be disassembled, or an integral jig, and the size and/or shape of the inner periphery thereof may be in a predetermined size and/or shape, or the size and/or shape thereof may be changeable by the narrowing of the inner peripheral face which enables the honeycomb member aggregated body 16 to be bound tightly. Moreover, the manufacturing apparatus 50 may be an assembling-type jig in which the paste supplying chambers 52 and 52' are detachable.

In the case where the manufacturing apparatus 50 is an assembling-type jig that can be disassembled, or a jig in which the size and/or shape of the inner periphery is changeable, the process of manufacturing a honeycomb member aggregated body 16 by piling-up a plurality of honeycomb members 20 can be caffied out at the inner periphery of the manufacturing apparatus 50. It is of course possible to first manufacture a honeycomb member aggregated body 16 and then placed this on the inner periphery of the manufacturing apparatus 50.

The paste supplying chambers 52 and 52' are not particularly limited as long as it is a container, placed on the outer periphery of the manufacturing apparatus 50, which allows the adhesive material paste 1400 to be charged into the inner chamber, and can pressurize the paste charged therein.

The shape, size and number of the supplying holes 51 and 51 are not particularly limited, but it is necessary for the position thereof to be located at a position corresponding to the cavity 141 formed between the honeycomb members 20 constituting the honeycomb member aggregated body 16, and it is desirable for the supplying holes 51 and 51' to be formed with a fixed interval so that the adhesive material paste 1400 can be easily filled into the cavity 141 without leak. Here, to make it easy to fill in the paste uniformly, it is more desirable for the supplying holes to be prepared as supplying grooves.

The pressure to be applied upon injecting the adhesive material paste 1400 into the manufacturing apparatus 50 is appropriately adjusted depending on the amount and viscosity of the adhesive material paste 1400 to be injected, and on the size, positions and number and the like of the supplying holes, and according to need, suction processes may be carried out in combination therewith on the end face opposite to the side where the supplying chamber 52' of the manufacturing apparatus 50 is attached.

The manufacturing apparatus 50 is used in the following manner.

As shown in FIGS. 5A and 5B, after honeycomb member aggregated bodies 16 has been assembled, this is housed in the honeycomb structured body manufacturing apparatus 50, and next the paste 1400 is injected from the paste supplying chambers 52 and 52' simultaneously. Alternatively, the honeycomb member aggregated bodies 16 are assembled in the honeycomb structured body manufacturing apparatus 50, and next the paste 1400 is injected from the paste supplying chambers 52 and 52' simultaneously. Both methods can be used.

Here, with respect to materials constituting the adhesive material paste to be filled between the honeycomb members, since it has been explained, the explanation thereof is omitted.

By using the method in which an adhesive material paste is injected in the cavity between the honeycomb members from both the side and end faces simultaneously, after completing the subsequent processes, it becomes possible to manufacture a honeycomb structured body having the degree of orientation $\Omega$ of the inorganic fibers in the adhesive layer within the above range.

Here, the degree of orientation $\Omega$ of the inorganic fibers becomes possible to be adjusted by appropriately selecting the injection pressure from the side face and the injection pressure from end face.

Also, by vibrating the honeycomb member aggregated body in which the adhesive material paste has been injected, it becomes possible to adjust the degree of orientation of inorganic fibers.

Next, the honeycomb member aggregated body is heated so that the adhesive material paste layer is heated at a temperature of at least about 50° C. and at most about 150° C. for about 1 hour to be dried and solidified, the adhesive layer 11 is obtained.

Moreover, the honeycomb material aggregated body in which a plurality of the honeycomb members 20 are bonded to one another by interposing the adhesive layers 11 is put into a cutting process by using a diamond cutter and the like so that a honeycomb block 15 having a cylindrical shape is manufactured.

By forming a coating material layer 12 on the outer periphery of the honeycomb block 15 using the coating material paste, it becomes possible to manufacture a honeycomb structured body 10 in which the coating material layer 12 is formed on the peripheral portion of the cylindrical honeycomb block 15 having a plurality of the honeycomb members 20 bonded to one another by interposing the adhesive layers 11.

Next, if necessary, heat treatment is carried out to remove organic binders in the adhesive layer, and/or the cavity-holding member.

Moreover, depends on needs, a catalyst is supported on the honeycomb structured body (cell wall). The catalyst may be supported on the honeycomb member before the aggregated body is manufactured.

When a catalyst is supported, for example, an alumina film having a high specific surface area is formed on the surface of the cell walls, and a co-catalyst and a catalyst such as platinum may be supported on the surface of this alumina film.

In the method for manufacturing a honeycomb structured body according to the embodiments of the present invention, the adhesive layer is formed by filling the cavity of honeycomb members with a predetermined adhesive material paste; thus, it is possible to manufacture a honeycomb structured body having a thermal shock resistance capable of absorbing thermal expansion. In addition, assembling honeycomb members to one another by interposing a cavity-holding member makes it possible to adjust the thickness of the adhesive layer between the honeycomb members. Further, when the degree of orientation of inorganic fibers included in the adhesive material paste is within a certain range, it becomes possible to absorb the thermal expansion in the honeycomb member due to a thermal stress, and thus to manufacture the honeycomb structured body superior in thermal shock resistance. Moreover, when the positions of the cavity-holding members disposed on the honeycomb members are at the four corners of the side faces of the honeycomb members, it becomes possible to combine honeycomb members in parallel with one another. In the method for manufacturing a honeycomb structured body according to the embodiments of the present invention, by vibrating the honeycomb member aggregated body in which the adhesive material paste has been injected, it becomes possible to adjust the degree of orientation of inorganic fibers.

In the honeycomb structured body manufacturing apparatus according to the embodiments of the present invention, a method in which the adhesive material paste is injected into the cavity of honeycomb members from both the side face and end face at the same time is used; thereby, through subsequent processes, it becomes possible to manufacture a honeycomb structured body having the degree of orientation $\Omega$ of the inorganic fibers in the adhesive layer within the above range. In the honeycomb structured body manufacturing apparatus according to the present invention, it becomes possible to prevent the adhesive material paste from adhering to the end face of the honeycomb member aggregated body when filling a cavity between the honeycomb members of the honeycomb member aggregated body with an adhesive material paste. Further, it becomes possible to exhaust the air inside the manufacturing apparatus through the end face of the manufacturing apparatus when the bottom plate constituting the manufacturing apparatus is air permeable or has air holes. Furthermore, it becomes possible to assemble the honeycomb members at the inner periphery of the manufacturing apparatus when the cylindrical body constituting the manufacturing apparatus is an assembling-type jig or a jig capable of tightly binding the honeycomb member aggregated body. Also, it becomes possible to fill in the adhesive material paste uniformly when the openings provided on the cylindrical body are supplying grooves.

Until here, although the honeycomb structured body capable of being used preferably as a ceramic filter has been mainly described as an example of the honeycomb structured body according to the embodiments of the present invention, the honeycomb structured body according to the embodiments of the present invention may be a honeycomb structured body in which an end portion of each of the plurality of cells is not sealed. It is possible to use a honeycomb structured body according to the embodiments of this kind preferably as a catalyst supporting carrier and to obtain the effect of the present invention which is the same as the effect obtained in the case it is used as a ceramic filter.

EXAMPLES

The following description will discuss the present invention in detail by means of examples, however, the present invention is not intended to be limited by these examples.

Example 1

Powder of α-type silicon carbide having an average particle diameter of 10 μm (7000 parts by weight) and powder of α-type silicon carbide having an average particle diameter of 0.5 μm (3000 parts by weight) were wet-mixed, and to 10000 parts by weight of the resulting mixture were added 570 parts by weight of organic binder (methyl cellulose) and 1770 parts by weight of water, and kneaded to obtain a mixed composition.

Next, to the above-mentioned mixed composition were added 330 parts by weight of a plasticizer (trade name: Unilube, made by NOF Corp.) and 150 parts by weight of glycerin serving as a lubricant, followed by kneading, and then extrusion-molded to manufacture a raw molded body having a rectangular pillar shape as shown in FIG. 2.

After the above-mentioned raw molded body had been dried by using a microwave drier or the like to manufacture a ceramic dried body, predetermined cells were filled with a plug material paste having the same composition as the raw molded body.

After this had been again dried by using a drier, the resulting product was degreased at a temperature of 400° C., and fired at a temperature of 2200° C. under a normal-pressure argon atmosphere for 3 hours to manufacture a honeycomb member having a silicon carbide sintered body, in which a porosity was 42%, an average pore diameter was 11 μm, the size thereof is 34.3 mm×34.3 mm×150 mm, the number of cells was 46.5 pcs/cm$^2$ (300 cpsi) and a thickness of substantially all the cell walls 23 was 0.25 mm.

Next, a heat resistant adhesive material paste containing 30% by weight of alumina fiber having fiber length of 20 μm and fiber diameter of 2 μm, 21% by weight of silicon carbide particle having an average particle diameter of 0.6 μm, 15% by weight of silica sol, 5.6% by weight of carboxymethyl cellulose, and 28.4% by weight of water was prepared.

The viscosity of the adhesive material paste was 30 Pa·s at a room temperature.

Next, one each, four in total of cavity-holding members 142, each made of a cardboard having a size of 5 mm in diameter×1 mm in thickness, with a sticking material applied to both faces thereof, were placed near the four corners of the side faces of the honeycomb members 20, and secured thereon. Specifically, the cavity-holding members 142 were placed and secured at the positions where the minimum distance between the outer periphery of the cavity-holding members 142 and the respective two sides forming the corners of the side faces was 6.5 mm. Thereafter, the honeycomb members 20 assembled vertically 4 pcs ×horizontally 4 pcs were combined one another by interposing the cavity-holding members 142 to assemble the honeycomb member aggregated body 16 (see FIG. 4 ).

Next, the honeycomb member aggregated body 16 was placed in the honeycomb structured body manufacturing apparatus 50, which was equipped with the paste supplying chambers 52 and 52', and with the inner periphery sizing 145 mm in height ×145 mm in width ×150 mm in length as shown in FIGS. 5A and 5B. The honeycomb structured body manufacturing apparatus 50 had three supplying grooves with a width of 5 mm, which allow the inner chamber of the supplying chambers 52 and 52' to communicate with the interior space of the manufacturing apparatus 50, at the positions corresponding to the cavities 141 formed between the honeycomb members 20 constituting the honeycomb member aggregated body 16.

In the honeycomb structured body manufacturing apparatus 50, retractable bottom plates 53, which could contact with the end face, were attached at the end portion on the side opposite to the side where the paste supplying chamber was attached. By closing the bottom plate 53 to contact with the end face of the honeycomb member aggregated body 16, the cavities 141 existing between honeycomb members 20 were sealed.

After that, the adhesive material paste 1400 was charged into the paste supplying chambers 52 and 52' of the honeycomb structured body manufacturing apparatus 50, and further injected into the inner periphery of the honeycomb structured body manufacturing apparatus 50 by applying a pressure of 0.2 MPa at the side of the supplying chamber 52 (side face of the honeycomb member aggregated body) and a pressure of 0.05 MPa at the side of the supplying chamber 52' (end face of the honeycomb member aggregated body) to fill the adhesive material paste 1400 in the cavities between the honeycomb members.

Next, the honeycomb member aggregated body 16, in which the adhesive material paste 1400 was filled between the honeycomb members 30, was dried at a temperature of 100° C. for 1 hour to cure the adhesive material paste 1400 so that an adhesive layer 14 having a thickness of 1 mm was formed, thereby a honeycomb member aggregated body was obtained.

Next, the honeycomb member aggregated body was put into cutting process using a diamond cutter, to manufacture a cylindrical-shaped honeycomb block 15 having a diameter of 142 mm.

Next, 23.3% by weight of ceramic fibers made of alumina silicate (shot content: 3%, fiber length: 5 to 100 μm) which served as inorganic fiber, 30.2% by weight of silicon carbide powder having an average particle diameter of 0.3 μm which served as inorganic particles, 7% by weight of silica sol ($SiO_2$ content in the sol: 30% by weight) which served as an inorganic binder, 0.5% by weight of carboxymethyl cellulose which served as an organic binder, and 39% by weight of water were mixed and kneaded to prepare a coating material paste.

Next, a coating material paste layer was formed on the peripheral portion of the honeycomb block 15 by using the above-mentioned coating material paste. Further, this coating material paste layer was dried at a temperature of 120° C. so that a cylindrical aggregated honeycomb structured body having a size of 143.8 mm in diameter×150 mm in length was manufactured.

Examples 2 to 7

A honeycomb structured body was manufactured through the same processes as in Example 1, except that the pressure applied upon injecting the adhesive material paste from the paste supplying chambers 52 and 52' were set to the values as shown in Table 1.

Comparative Examples 1 to 3

A honeycomb structured body was manufactured through the same processes as in Example 1, except that the pressure applied upon injecting the adhesive material paste from the paste supplying chambers 52 and 52' were set to the values as shown in Table 1.

In Comparative Example 1, the adhesive material paste was injected only from the paste supplying chamber 52, and in Comparative Example 2, the adhesive material paste is injected only from the paste supplying chamber 52'.

(Evaluation)

(1) Measurements of Degree of Orientation Ω

Figure 7A:
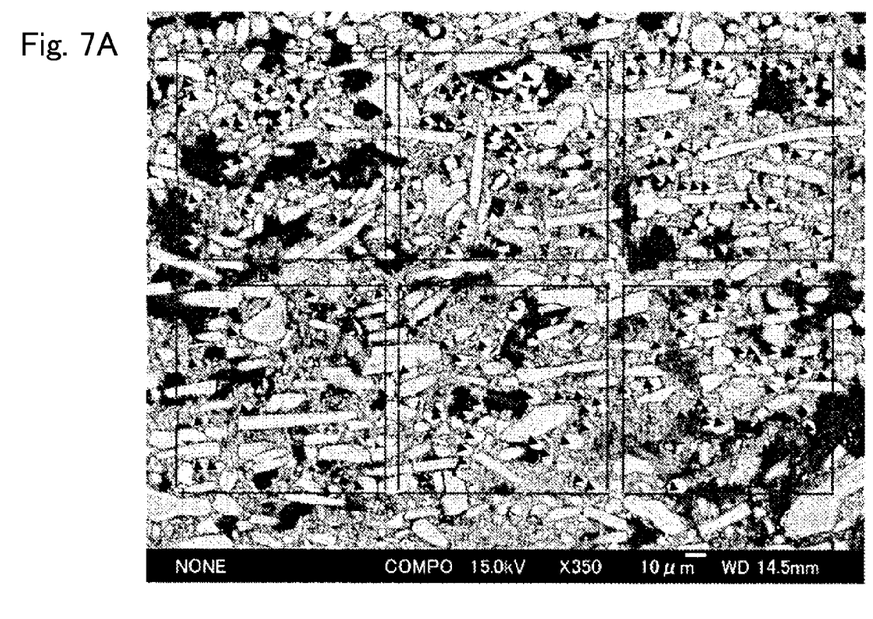
FIG. 7A is a SEM photograph of a surface perpendicular to the orientation axis of the adhesive layer which was taken upon measuring the degree of orientation $\Omega$ of a honeycomb structured body.
Figure 7B:
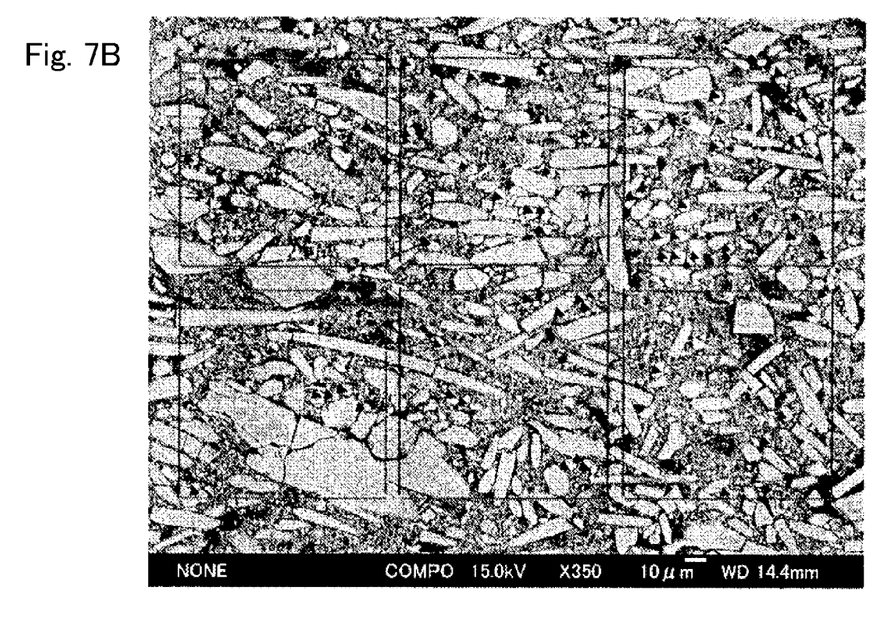
FIG. 7B is a SEM photograph of a surface parallel to the orientation axis of the adhesive layer which was taken upon measuring the degree of orientation $\Omega$ of a honeycomb structured body.

With respect to six faces perpendicular to the orientation axis of the adhesive layer and six faces parallel to the orientation axis thereof in each of honeycomb structured bodies of Examples and Comparative Examples, SEM photographs (magnification: ×350) as in FIGS. 7A and 7B were taken so that the number of inorganic fibers penetrating each of the photograph surfaces was counted, and the average value was calculated, and defined as the number of the inorganic fibers penetrating the face perpendicular to the orientation axis and the face parallel to the orientation axis.

Moreover, based upon the number of the inorganic fibers, the degree of orientation Ω was calculated by using the aforementioned formulae (1) to (3).

The results are shown in Table 1.

In the measurements on the degree of orientation, those fibers that were observed with an aspect ratio of 1.5 or less on the photographed face as described above were defined as penetrating inorganic fibers.

Here, in this measuring method, although there was a possibility that those observed with an aspect ratio of 1.5 or less on the photographed face included inorganic particles and shots of inorganic fibers, the calculations on the degree of orientation Ω were carried out with the above included therein.

(2) Measurements On Push-Out Strength Before and After Heat Cycle Test

The push-out strength of each of the honeycomb structured bodies of Examples and Comparative Examples was measured by using the following method before and after a heat cycle test. The results are shown in Table 1.

Figure 6A:
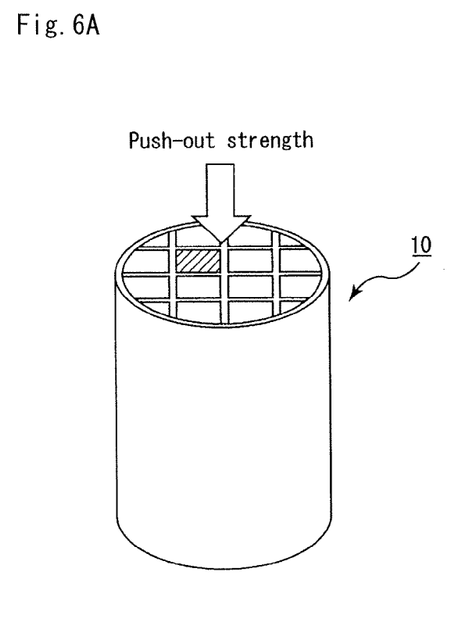
FIGS. 6A and 6B are schematic views that describe a method of the push-out strength test.
Figure 6B:
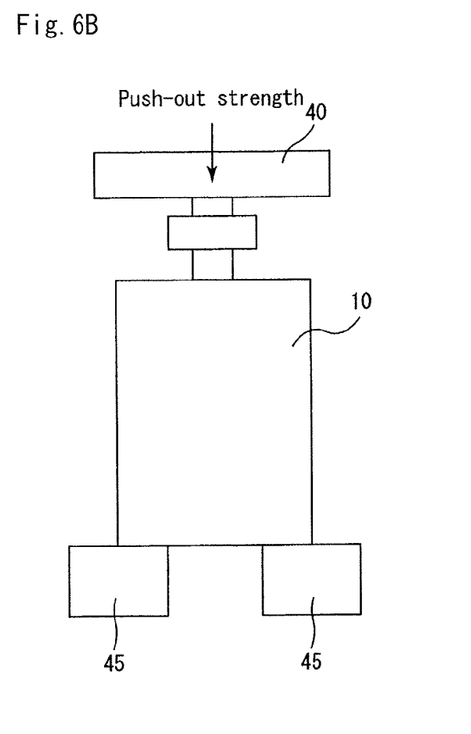

The measurements on the push-out strength were carried out through processes in which, as shown in FIGS. 6A and 6B, after a honeycomb structured body 10 had been placed on a base 45, by applying a push-out load (pressure applying speed: 1 mm/min) to a honeycomb member in the center thereof with a jig 40 made of aluminum having a diameter of 30 mm, and measuring the breaking strength (push-out strength). Here, in the measurements on strength, an Instron type universal tensile meter (Model 5582) was used.

Moreover, in the heat cycle test, a honeycomb structured body, which had been maintained at a temperature of 200° C., was heated to 800° C., and then cooled to 200° C., and these processes were used as one cycle; thus, the heat cycle test was carried out by repeating this cycle 100 times.

TABLE 1

| | Injection pressure from supplying chamber 52 (MPa) | Injection pressure from supplying chamber 52' (MPa) | Number of inorganic fibers penetrating face parallel to orientation axis | Number of inorganic fibers penetrating face perpendicular to orientation axis | Degree of orientation Ω | Push-out load (×10⁴N) | |
|---|---|---|---|---|---|---|---|
| | | | | | | Before heat cycle test | After heat cycle test |
| Example 1 | 0.20 | 0.05 | 30.2 | 6.2 | 0.66 | 2.86 | 1.91 |
| Example 2 | 0.20 | 0.10 | 29.9 | 10.5 | 0.48 | 3.65 | 2.37 |
| Example 3 | 0.20 | 0.12 | 28.2 | 11.2 | 0.43 | 3.77 | 2.45 |
| Example 4 | 0.20 | 0.15 | 26.4 | 16.7 | 0.23 | 3.74 | 2.43 |
| Example 5 | 0.15 | 0.20 | 9.8 | 16.7 | −0.26 | 3.38 | 2.17 |
| Example 6 | 0.10 | 0.20 | 8.7 | 23.5 | −0.46 | 3.30 | 2.05 |
| Example 7 | 0.05 | 0.20 | 6.1 | 28.0 | −0.64 | 2.71 | 1.80 |
| Comparative Example 1 | 0.20 | 0 | 39.5 | 5.9 | 0.74 | 2.53 | 1.55 |
| Comparative Example 2 | 0 | 0.20 | 5.6 | 38.4 | −0.75 | 2.58 | 1.44 |
| Comparative Example 3 | 0.20 | 0.20 | 18.6 | 16.7 | 0.05 | 1.79 | 0.95 |

As indicated by Table 1, in the honeycomb structured bodies of the Examples, since the degree of orientation Ω was set in the range of $0.2 \leq \Omega \leq 0.7$ or in the range of $-0.7 \leq \Omega \leq -0.2$, the push-out load was great (adhesion strength was high) before the heat cycle test, and the great push-out load (high adhesion strength) was also maintained after the heat cycle test.

In contrast, in the honeycomb structured bodies of Comparative Examples 1 and 2, since the degree of orientation Ω was exceeding 0.7, or less than −0.7, the comparatively great push-out load was maintained before the heat cycle test; however, after the heat cycle test, there was a big reduction in the push-out load (reduction in adhesion strength).

Moreover, in the honeycomb structured body of Comparative Example 3, since the degree of orientation Ω was 0.05, which is less than the degree of orientation Ω of 0.2, the push-out load became small (reduction in adhesion strength) before the heat cycle test.

What is claimed as new and desired to be secured by Letters Patent of the United States is:

1. A honeycomb structured body comprising:
   a plurality of honeycomb members, each of the honeycomb members having a number of cells placed in parallel with one another in a longitudinal direction with a cell wall therebetween; and
   an adhesive layer including at least inorganic fibers and an inorganic binder,
   wherein the plurality of honeycomb members are bonded to one another by interposing the adhesive layer,
   wherein the inorganic fibers have a degree of orientation Ω defined as:

$\Omega = (LV)_{or}/\{(LV)_{or}+(LV)_{is}\}$, where:
   $(LV)_{is} = 2(PA)\|$;
   $(LV)_{or} = (PA)\perp - (PA)\|$;
   $(PA)\perp$ is a number of intersections of the inorganic fibers to a first test face of unit area that is perpendicular to an orientation axis, the orientation axis being defined along the longitudinal direction; and
   $(PA)\|$ is a number of intersections of the inorganic fibers to a second test face of unit area that is parallel to the orientation axis, and
   wherein the degree of orientation Ω is set in a range of about $0.2 \leq \Omega \leq$ about 0.7 or in a range of about $-0.7 \leq \Omega \leq$ about $-0.2$.

2. The honeycomb structured body according to claim 1, wherein the aspect ratio of said inorganic fiber is set to at least about 3 and at most about 50.

3. The honeycomb structured body according to claim 1, wherein a coating material layer is formed on the peripheral portion of said honeycomb structured body.

4. The honeycomb structured body according to claim 1, wherein either one of the ends of each of said cells is sealed with a plug.

5. The honeycomb structured body according to claim 1, wherein a catalyst is supported on at least a portion of said cell wall.

6. The honeycomb structured body according to claim 1, wherein said inorganic fiber is a silica-alumina fiber, a mullite fiber, an alumina fiber, a silica fiber or an aluminum borate whisker.

7. The honeycomb structured body according to claim 1, wherein the average fiber diameter of said inorganic fiber is at least about 0.5 μm and at most about 10 μm.

8. The honeycomb structured body according to claim 1, wherein the average fiber length of said inorganic fiber is at least about 1.5 μm and at most about 500 μm.

9. The honeycomb structured body according to claim 1, wherein said inorganic binder is a silica-sol or an alumina-sol.

10. The honeycomb structured body according to claim 1, wherein said adhesive layer further includes inorganic particles.

11. The honeycomb structured body according to claim 10, wherein said inorganic particles are silicon carbide particles, silicon nitride particles, boron nitride particles, alumina particles, or silica particles.

* * * * *